United States Patent
Fernando et al.

(10) Patent No.: US 12,472,005 B2
(45) Date of Patent: Nov. 18, 2025

(54) METHODS AND SYSTEMS FOR TOOL TRACKING

(71) Applicant: KONINKLIJKE PHILIPS N.V., Eindhoven (NL)

(72) Inventors: Shakith Devinda Fernando, Eindhoven (NL); Karl Catharina Van Bree, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 299 days.

(21) Appl. No.: 18/027,484

(22) PCT Filed: Sep. 23, 2021

(86) PCT No.: PCT/EP2021/076143
§ 371 (c)(1),
(2) Date: Mar. 21, 2023

(87) PCT Pub. No.: WO2022/069328
PCT Pub. Date: Apr. 7, 2022

(65) Prior Publication Data
US 2023/0372023 A1 Nov. 23, 2023

(30) Foreign Application Priority Data
Sep. 29, 2020 (EP) .................................. 20198893

(51) Int. Cl.
*A61B 34/20* (2016.01)
*A61B 5/00* (2006.01)
(Continued)

(52) U.S. Cl.
CPC ............ *A61B 34/20* (2016.02); *A61B 5/0073* (2013.01); *A61B 8/0841* (2013.01);
(Continued)

(58) Field of Classification Search
CPC ........ A61B 17/3403; A61B 2017/3413; A61B 2034/107; A61B 2034/2055;
(Continued)

(56) References Cited

U.S. PATENT DOCUMENTS

| 9,895,135 B2 | 2/2018 | Pelissier et al. |
| 2007/0195089 A1* | 8/2007 | Furukado .................. G06T 7/73 |
| | | 345/426 |
| 2013/0218024 A1 | 8/2013 | Boctor et al. |

(Continued)

FOREIGN PATENT DOCUMENTS

| CN | 202086502 U | 12/2011 |
| CN | 110368076 A | 10/2019 |

(Continued)

OTHER PUBLICATIONS https://www.philips.nl/healthcare/solutions/ultrasound/all-ultrasound-products, downloaded from Internet Mar. 20, 2023, pp. 1-15.
International Search Report and Written Opinion of PCT/EP2021/076143, dated Nov. 11, 2021.

*Primary Examiner* — Christopher L Cook

(57) ABSTRACT

The invention provides a method for determining an orientation of a tool for performing a medical intervention on a subject. The method includes obtaining image data for an image of a surface of, or over, a subject, a tool adjacent the surface and a tool shadow on the surface, the tool shadow resulting from light incident on the tool generated by way of at least one light source positioned at a predetermined position relative to the image sensor. A representation of the surface is obtained and representations of the tool and the tool shadow are segmented from the image data and used to determine an elevation angle of the tool. The orientation of the tool is determined based on the segmented representation of the tool, the segmented representation of the tool shadow and the elevation angle.

20 Claims, 4 Drawing Sheets

(51) Int. Cl.
*A61B 8/08* (2006.01)
*A61B 17/34* (2006.01)
*A61B 34/10* (2016.01)
*G06T 7/73* (2017.01)

(52) U.S. Cl.
CPC .......... *A61B 17/3403* (2013.01); *A61B 34/10* (2016.02); *G06T 7/73* (2017.01); *A61B 2017/3413* (2013.01); *A61B 2034/107* (2016.02); *A61B 2034/2055* (2016.02)

(58) Field of Classification Search
CPC ............ A61B 2034/2065; A61B 34/10; A61B 34/20; A61B 5/0073; A61B 8/0841; A61B 90/36; G06T 7/73
See application file for complete search history.

(56) References Cited

U.S. PATENT DOCUMENTS

| | | | |
|---|---|---|---|
| 2015/0202010 A1 | 7/2015 | Lee et al. | |
| 2017/0358104 A1* | 12/2017 | Zhang | G06T 7/73 |
| 2021/0290335 A1* | 9/2021 | Roy | A61B 90/11 |
| 2023/0045275 A1* | 2/2023 | Benseghir | A61B 90/37 |

FOREIGN PATENT DOCUMENTS

| | | | |
|---|---|---|---|
| DE | 102019211870 | * | 9/2020 |
| DE | 102019211870 A1 | | 9/2020 |
| TW | I679996 B | | 12/2019 |
| WO | 2018055637 A1 | | 3/2018 |
| WO | 2021130052 A1 | | 7/2021 |
| WO | 2022101285 A1 | | 5/2022 |

* cited by examiner

METHODS AND SYSTEMS FOR TOOL TRACKING

CROSS-REFERENCE TO PRIOR APPLICATIONS

This application is the U.S. National Phase application under 35 U.S.C. § 371 of International Application No. PCT/EP2021/076143, filed on Sep. 23, 2021, which claims the benefit of European Patent Application No. 20198893.8, filed on Sep. 29, 2020. These applications are hereby incorporated by reference herein.

FIELD OF THE INVENTION

The invention relates to the field of interventional tool tracking, and more specifically to the field of image based interventional tool tracking.

BACKGROUND OF THE INVENTION

There are numerous interventional procedures that require the accurate insertion of a tool through a surface, such as the skin, of a subject. For example, in interventional or diagnostic cases, finding and identifying vascular and/or tumor access with the correct needle trajectory is critical.

Exemplary use-cases include: needle access for regional anesthesia; cannulation of tubes into the subject's veins; and an ablation catheter requiring tumor access. However, interpreting sub-surface image data, such as ultrasound images, in the use-cases described above is challenging and requires a trained, highly-skilled professional to interpret the images accurately and a great deal of mental effort to plan the needle trajectory, which often requires several trial and error iterations of skin entry until the correct trajectory is achieved.

Ultrasound is a popular medical imaging method and is used in many interventional and diagnostic applications. Ultrasound systems vary from high-end EPIQ (Trade Mark) machines of Philips to portable, low-cost solutions. There is a trend towards developing mobile ultrasound imaging solutions that allow handheld ultrasound devices to be connected to a mobile device, such as a smartphone.

Currently, the only solution for tracking an interventional tool in an ultrasound system relies only on tracking the tip of the tool. However, it is only possible to track the tip of a tool after the tool has been inserted into the skin of the subject and when the tool tip is within the acoustic field of view of the ultrasound probe. The trajectory planning for the tool must then be performed mentally by the clinician based on the tracked tool tip.

For trajectory planning to be performed accurately, the tool must be in-plane with the ultrasound imaging plane. Out-of-plane needle trajectory is very difficult to predict as 3D information is not visible. Further, in the case of ablation catheter tracking, the uncertainty in the location of the tip will be even larger due physical limitations in the ablation catheter tip, meaning the tracking accuracy will decrease. Due to the above limitations, multiple skin entries are typically required to identify the correct tool trajectory, which can lead to discomfort and slower recovery for the subject.

There is therefore a need for a means of accurately tracking an interventional tool before insertion.

SUMMARY OF THE INVENTION

The invention is defined by the claims.

According to the current disclosure, there is provided a method for determining an orientation of a tool for performing a medical intervention on a subject, the method comprising:
  obtaining, using an image sensor, image data for an image of a surface of, or over, a subject, a tool adjacent the surface and a tool shadow on the surface, the tool shadow resulting from light incident on the tool generated by way of at least one light source positioned at a predetermined position relative to the image sensor;
  obtaining a representation of the surface;
  segmenting a representation of the tool from the image data;
  segmenting a representation of the tool shadow from the image data;
  determining an elevation angle of the tool based on the representation of the surface, the representation of the tool and the representation of the tool shadow, the elevation angle being the angle between the surface and the tool;
  determining an orientation of the tool relative to the surface based on the segmented representation of the tool, the segmented representation of the tool shadow and the elevation angle.

The method provides a means of tracking the orientation of a tool based on the shadow cast by the tool on or over a surface of the subject.

By calculating the orientation of the tool based on the shadow cast by the tool on the surface, the orientation of the tool may be more accurately known before the tool passes through the surface, thereby improving the accuracy of the selection of the tool entry point and tool steering by a user.

In addition, by determining the orientation of the tool based on the tool and the tool shadow, rather than only the tip of the tool, the proportion of the tool used to determine the orientation of the tool is increased, thereby improving the accuracy of the orientation determination.

In an embodiment, the method further comprises identifying a surface contact point based on the image data, the surface contact point being a location on the surface where the tool makes contact with the surface, based on the representation of the tool and the representation of the tool shadow, and wherein determining the elevation angle of the tool is further based on the surface contact point.

In this way, the accuracy of the determined orientation of the tool may be improved by taking into account the surface contact point.

In an embodiment, obtaining the representation of the surface comprises:
  obtaining motion data by way of a motion sensor, the motion data representing a motion of the image sensor during the acquisition of the image data;
  generating a 3D surface map of the surface of the subject based on a combination of the image data and the motion data; and
  segmenting the representation of the surface from the 3D surface map.

In this way, the topography of the surface, which will affect both the representation of the surface and the representation of the tool shadow, may be taken into account when determining the orientation of the tool, thereby improving the accuracy of the determined orientation.

In an embodiment, the method further comprises obtaining computer tomography data of the surface of the subject, the surface having one or more radiopaque markers secured thereon, and wherein segmenting the representation of the surface is based on a combination of the computer tomography data, the image data and the motion data.

In this way, the accuracy of the segmentation of the surface may be increased.

In an embodiment, obtaining the representation of the surface comprises generating a 2D plane approximation of the surface.

In an embodiment, determining the elevation angle of the tool comprises:
- calculating a shadow angle between the representation of the tool and the representation of the tool shadow; and
- determining the elevation angle by adjusting the shadow angle based on the position of the at least one light source relative to the image sensor.

In an embodiment, determining the elevation angle comprises applying a machine learning algorithm to the segmented representation of the tool and the segmented representation of the tool shadow.

In this way, the elevation angle may be accurately determined using reduced input data in a computationally efficient manner.

In an embodiment, the method further comprises calculating a projected trajectory of the tool based on the determined orientation of the tool, the projected trajectory representing the predicted path of the tool after the tool has passed through the surface of the subject.

In this way, the path of the tool after insertion may be predicted before the tool passes through the surface, meaning that the orientation may be refined in order to position the tool appropriately without requiring unnecessary penetration of the surface.

In an embodiment, the method further comprises generating a real-time visualization of the orientation of the tool with respect to the representation of the surface.

In this way, the user may be provided with an accurate and real-time representation of the orientation of the tool to guide the user to the desired orientation.

In an embodiment, the light generated by the at least one light source is coded light, each light source having a unique coded light signature, thereby causing one or more unique modulated shadows to be cast by the tool, wherein the method further comprises:
- for each of the one or more unique modulated shadows, deriving the unique coded signature from the unique modulated shadow; and
- pairing each of the one or more unique modulated shadows with a light source based on the derived unique coded signature; and wherein,
- segmenting the representation of the tool shadow is based on the paired one or more unique modulated shadows.

In this way, the tool shadows may be distinguished from each other, which means that the determined orientation may be determined with greater accuracy.

According to the disclosure there is further provided a computer program comprising computer program code means which is adapted, when said computer program is run on a computer, to implement the steps of:
- obtaining, using an image sensor, image data for an image of a surface of, or over, a subject, a tool for performing a medical intervention on a subject adjacent the surface and a tool shadow on the surface, the tool shadow resulting from light incident on the tool generated by way of at least one light source positioned at a predetermined position relative to the image sensor;
- obtaining a representation of the surface;
- segmenting a representation of the tool from the image data;
- segmenting a representation of the tool shadow from the image data;
- determining an elevation angle of the tool based on the representation of the surface, the representation of the tool and the representation of the tool shadow, the elevation angle being the angle between the surface and the tool;
- determining an orientation of the tool relative to the surface based on the segmented representation of the tool, the segmented representation of the tool shadow and the elevation angle.

In an embodiment, the computer program is adapted, when said computer program is run on a computer, to perform the additional steps of identifying a surface contact point based on the image data, the surface contact point being a location on the surface where the tool makes contact with the surface, based on the representation of the tool and the representation of the tool shadow, and wherein determining the elevation angle of the tool is further based on the surface contact point.

According to the current disclosure there is further provided a computer-readable storage medium comprising instructions which, when executed by a computer, cause the computer to carry out the steps of:
- obtaining, using an image sensor, image data for an image of a surface of, or over, a subject, a tool for performing a medical intervention on a subject adjacent the surface and a tool shadow on the surface, the tool shadow resulting from light incident on the tool generated by way of at least one light source positioned at a predetermined position relative to the image sensor;
- obtaining a representation of the surface;
- segmenting a representation of the tool from the image data;
- segmenting a representation of the tool shadow from the image data;
- determining an elevation angle of the tool based on the representation of the surface, the representation of the tool and the representation of the tool shadow, the elevation angle being the angle between the surface and the tool;
- determining an orientation of the tool relative to the surface based on the segmented representation of the tool, the segmented representation of the tool shadow and the elevation angle.

In an the computer-readable storage medium further comprises instructions which, when executed by a computer, cause the computer to carry out the additional steps of identifying a surface contact point within the image data, the surface contact point being a location on the surface where the tool makes contact with the surface, based on the representation of the tool and the representation of the tool shadow, and wherein determining the elevation angle of the tool is further based on the surface contact point.

According to the current disclosure there is further provided a processing system for determining the orientation of a tool for performing a medical intervention on a subject, the processing system comprising:
- an input for receiving image data from an image sensor for an image of a surface of, or over, a subject, a tool adjacent the surface and a tool shadow on the surface, the tool shadow resulting from light incident on the tool generated by way of at least one light source positioned at a predetermined position relative to the image sensor; and a processor coupled to the input to:
obtain a representation of the surface;
segment a representation of the tool from the image data;
segment a representation of the tool shadow from the image data;
determine an elevation angle of the tool based on the representation of the surface, the representation of the tool and the representation of the tool shadow, the elevation angle being the angle between the surface and the tool; and
determine an orientation of the tool relative to the surface based on the segmented representation of the tool and the segmented representation of the tool shadow.

According to the current disclosure there is further provided a system for determining the orientation of a tool, the system comprising:
the processing system defined herein (claimed in claim 15);
a tool for performing a medical intervention on a subject, the tool being adapted to pass through the surface of the subject;
an image sensor adapted to acquire the image data; and
at least one light source adapted to illuminate the tool, the light source being positioned at a predetermined position relative to the image sensor.

In an embodiment, the processing system is further adapted to identify a surface contact point based on the image data, the surface contact point being a location on the surface where the tool makes contact with the surface, based on the representation of the tool and the representation of the tool shadow, and wherein determining the elevation angle of the tool is further based on the surface contact point.

In an embodiment, the system further comprises a motion sensor coupled to the image sensor, the motion sensor being adapted to obtain motion data, the motion data representing a motion of the image sensor during the acquisition of the image data, and wherein the processing system, when obtaining the representation of the surface, is further adapted to:
generate a 3D surface map of the surface of the subject based on a combination of the image data and the motion data; and
segment the representation of the surface from the 3D surface map.

In an embodiment, the system further comprises an ultrasound probe, the ultrasound probe being adapted to obtain ultrasound data from an imaging region below the surface of the subject, wherein the image sensor is coupled to the ultrasound probe, and wherein the processing system is further adapted to:
obtain ultrasound data from the imaging region, the ultrasound data including an ultrasound representation of the tool after the tool has passed through the surface;
track the position of the tool based on the ultrasound data; and
update the orientation of the tool based on the tracked position of the tool.

In an embodiment, the at least one light source is adapted to generate coded light, each light source having a unique coded light signature, thereby causing one or more unique modulated shadows to be cast by the tool, and wherein the processing system is further adapted to:
for each of the one or more unique modulated shadows, derive the unique coded signature from the unique modulated shadow; and
pair each of the one or more unique modulated shadows with a light source based on the derived unique coded signature; and wherein,
segment the representation of the tool shadow is based on the paired one or more unique modulated shadows.

These and other aspects of the current disclosure will be apparent from and elucidated with reference to the embodiment(s) described hereinafter.

BRIEF DESCRIPTION OF THE DRAWINGS

For a better understanding of aspects and embodiments of the current disclosure, and to show more clearly how it may be carried into effect, reference will be made, by way of example only, to the accompanying schematic drawings, in which.

DETAILED DESCRIPTION OF THE EMBODIMENTS

Figure 1:
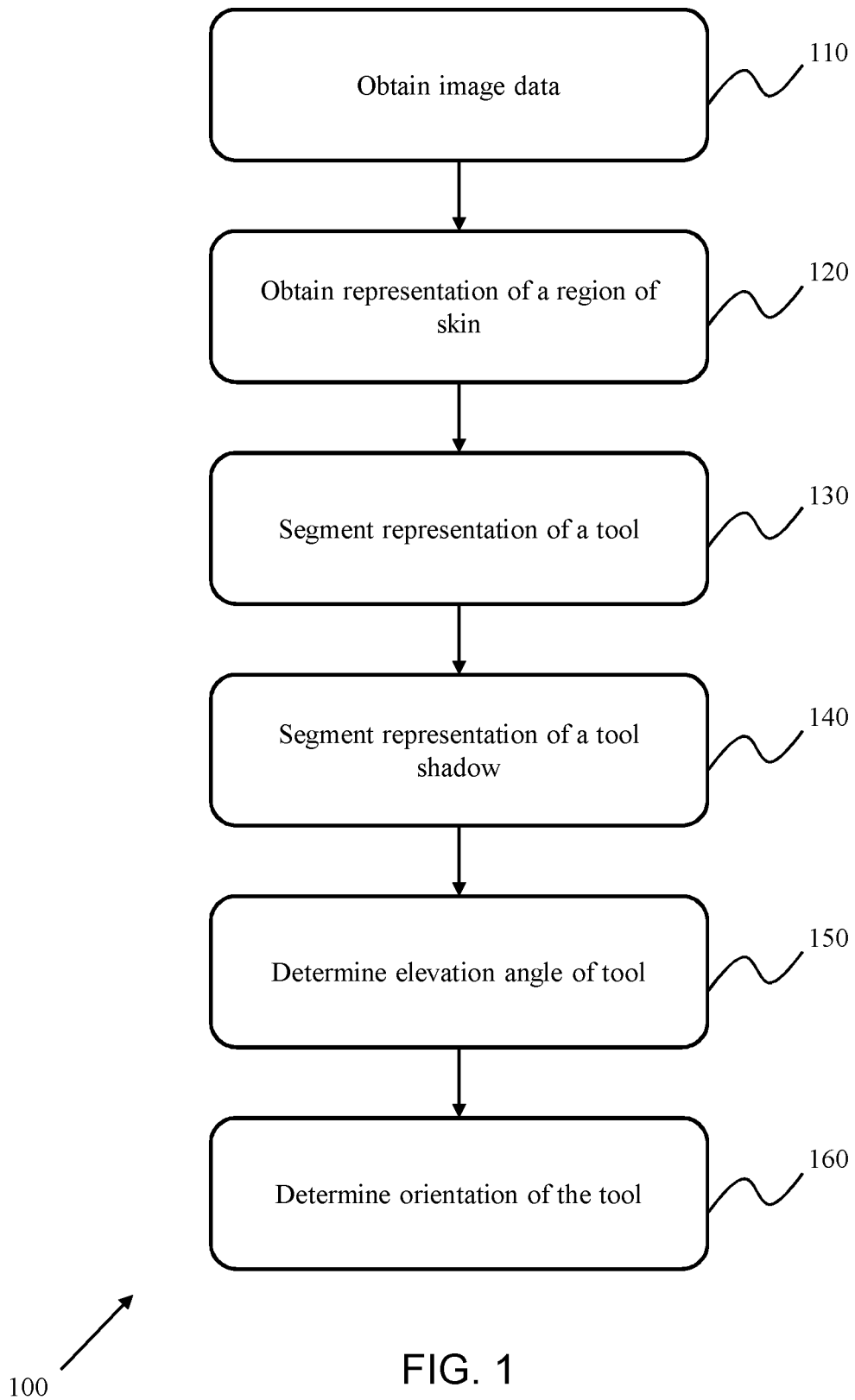
FIG. 1 shows a method of the current disclosure.

The detailed description and specific examples of the current disclosure, while indicating exemplary embodiments of the apparatus, systems and methods, are intended for purposes of illustration only and are not intended to limit the scope of the claims. These and other features, aspects, and advantages of the apparatus, systems and methods of the present disclosure will become better understood from the following description, appended claims, and accompanying drawings. The Figs. are merely schematic and are not drawn to scale. The same reference numerals are used throughout the Figs. to indicate the same or similar parts.

The current disclosure provides a method for determining an orientation of a tool for performing a medical intervention on a subject. The method includes obtaining image data for an image of a surface of, or over, a subject, a tool adjacent the surface and a tool shadow on the surface, the tool shadow resulting from light incident on the tool generated by way of at least one light source positioned at a predetermined position relative to the image sensor.

A representation of the surface is obtained, and representations of the tool and the tool shadow are segmented from the image data and used to determine an elevation angle of the tool. The orientation of the tool is determined based on the segmented representation of the tool, the segmented representation of the tool shadow and the elevation angle.

FIG. 1 shows a method 100 for determining an orientation of a tool for performing a medical intervention on a subject.

The method begins at step 110, wherein image data for an image of a surface of, or over, a subject is obtained by way of an image sensor. The image data is further representative of a tool adjacent the surface and a tool shadow on the surface, the tool shadow resulting from light incident on the tool generated by way of a light source positioned at a predetermined position relative to the image sensor.

In practice, e.g during a medical treatment by a user, a tool is positioned at a surface, such as the skin of the subject or a covering over the skin of the subject, within the field of view of the image sensor, at an initial orientation and position as chosen by the user. Light, generated by the light source positioned at a known location relative to the image sensor, is incident on the tool and the surface, which will result in a shadow being cast by the tool on the surface. The surface may be the skin of the subject or a covering, such as a garment or medical dressing, over the skin of the subject. Put another way, any surface on which the tool shadow falls, which is in view of the image sensor, may be used for determining the orientation of the tool.

In step 120, a representation of the surface is obtained. This may be achieved in several ways. For example, the image sensor may be part of a simultaneous localization and mapping (SLAM) unit, which may additionally comprise a motion sensor adapted to acquire motion signals representing the motion of the image sensor during the acquisition of the image data. In this case, the surface of the skin within the field of view of the image sensor, i.e. the representation of the surface being segmented, may be represented by key points that are identified in the image data and tracked within a 3D coordinate system generated by the SLAM unit. In other words, a 3D surface map of the surface of the subject may be generated based on a combination of the image data and the motion data. The representation of the surface may then be segmented from the 3D surface map. Further, the 3D surface map may be generated based solely on the image data using any suitable image processing technique.

If it is not possible to generate a 3D surface map, obtaining the representation of the surface may be achieved by generating a 2D plane approximation of the surface based on the image data.

A combination of 3D and 2D surface representation may be used if desired.

In step 130, a representation of the tool is segmented from the image data and in step 140, a representation of the tool shadow is segmented from the image data. The segmentation may be performed by way of any suitable segmentation method. For example, the image data may be analyzed using a color space variation algorithm in order to separate the tool shadow from the representation of the surface. However, other segmentation techniques capable of providing the desired representations may be used for this purpose. Although shown as separate steps for the purposes of clarity, the steps of segmenting the representations of the surface, the tool and the tool shadow may be performed simultaneously or near-simultaneously.

In step 150, an elevation angle of the tool is determined based on the representation of the surface, the representation of the tool and the representation of the tool shadow, the elevation angle being the angle between the surface and the tool.

In step 160, an orientation of the tool relative to the surface (and/or its surface representation) is determined based on the segmented representation of the tool, the segmented representation of the tool shadow and the elevation angle.

The method may further include calculating a projected trajectory of the tool based on the determined orientation of the tool, the projected trajectory representing the predicted path of the tool after the tool has passed through the surface of the subject. Put another way, after the orientation of the tool relative to the surface (and/or its surface representation) has been determined, the projected trajectory of the tool after insertion into the surface may be calculated. The projected trajectory may include a deformation of the tool after insertion into the surface, for example based on an anatomical model of the region being imaged or additional image data representing a structure under the surface, such as ultrasound image data.

Exemplary implementations of the methods described above are elaborated further below, with respect to FIGS. 3A and 3B.

Figure 2:
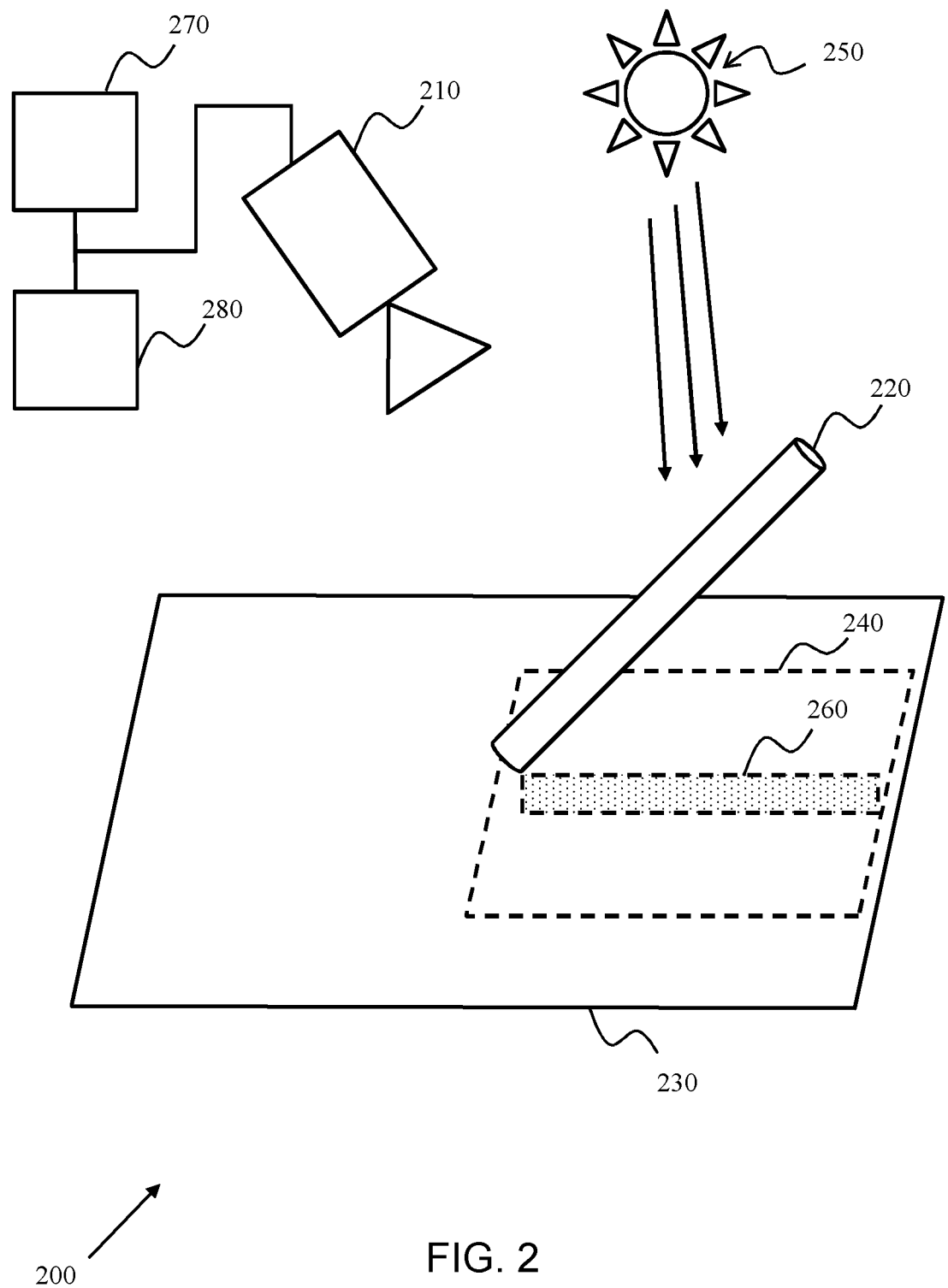
FIG. 2 shows a representation of an ultrasound imaging system according to the current disclosure.

FIG. 2 shows a schematic representation of an imaging system 200 adapted to implement the methods described herein. The system comprises an image sensor 210 adapted to acquire image data and a tool 220 for performing a medical intervention on a subject, for example by insertion into the skin 230 of a subject.

The image sensor 210 is adapted to acquire image data of a surface 240. The image sensor may be any suitable image sensor, such as a visible spectrum camera, a 3D camera, a time of flight camera, a LIDAR camera or an infra-red camera.

The tool may be any tool suitable for performing a medical intervention on the subject, such as a needle, a catheter, a tube and the like. The system further comprises at least one light source 250 adapted to illuminate the tool 220. The light source may be LED. It may provide directed light or diffuse light as long as enough shadowing of the tool onto the surface can be provided to be able to do a meaningful segmentation of the shadow.

When the light generated by the light source 250 is incident on the tool 220, a tool shadow 260 is cast on the skin 230 of the subject, and more specifically, on the surface 240 viewed by the image sensor. The determination of the orientation of the tool based on the tool shadow is described below with respect to FIG. 3.

The position of the light source relative to the image sensor is known. For example, the light source may be directly coupled to the image sensor or formed into an integrated unit with the image sensor. Alternatively, the light source may be separate from the image sensor, in which case the system may undergo a calibration stage before the method of the invention begins, wherein the position of the light source relative to the image sensor is determined by any suitable means. The light source may be a single light source or comprise a plurality of light sources. The plurality of light sources may be positioned in the same general location relative to the image sensor, or at different positions relative to the image sensor, wherein the position of each different light source, relative to the image sensor, is known. The light source, or light sources, may be modulated, or activated in a given activation pattern, to cause changes in the position of the tool shadow. The change in position, in combination with the known position of the light sources, provides a means of calculating a single orientation of the tool from a number of different sets of data, thereby increasing the accuracy of the determined orientation of the tool. In addition, the modulations of the light source may increase the accuracy of the segmentation of the representation of the tool shadow from the image data.

The at least one light source 250 may be adapted to generate coded light, each light source having a unique coded light signature, thereby causing one or more unique modulated shadows to be cast by the tool. In this case, for each of the one or more unique modulated shadows, the unique coded signature from the unique modulated shadow may be derived and paired with a light source based on the derived unique coded signature. The segmentation of the representation of the tool shadow may then be based on the paired one or more unique modulated shadows.

In addition, the system 200 comprises a processing unit 270 adapted to carry out the methods described herein. The processing unit may be any suitable processing unit, such as those within a computer, laptop, smart device or any other processing system. The processing unit may be in wired or wireless communication with the image sensor. The processing unit may be part of one or more of a personal computer, workstation, laptop computer, desktop or other non-mobile device. The processing unit may be part of one of a handheld or mobile device such as mobile phone or tablet or other such device. The processing unit can have input and/or output devices necessary for receiving or outputting the various data processed with the methods described herein.

The system 200 may further include a motion sensor unit 280 adapted to obtain motion data representing the motion of the image sensor, wherein the motion data is acquired alongside the image data. The motion sensor unit may include or be any suitable motion sensor, such as an accelerometer or a gyroscope. In the case that the system does include a motion sensor unit, the processing unit may generate a 3D surface map and/or 2D surface map of the surface of the subject based on the combination of the image data and the motion signal.

In an example, the processing unit 270 or the imaging system 200 may be integrated into a smart and/or mobile device, such as a smartphone, tablet or laptop, which comprises an image sensor, a light source, a motion sensor unit and a processor for simultaneous localization and mapping (SLAM) of the surface, tool and tool shadow. SLAM can be implemented ether in the smart and/or mobile device or a separate processing unit. In the case of the imaging system being integrated into a smart and/or mobile device, the device processor may perform the SLAM processing. Alternatively, dedicated SLAM hardware on the device may also implement the SLAM processing. Further, independent dedicated SLAM hardware may be used to implement the SLAM processing.

In other words, the image sensor unit, motion sensor unit and processor unit may form part of an integrated unit, such as that of a non-mobile or mobile computer or device as for example mentioned herein before. Preferably they are integrated in a mobile device such as a smartphone or SLAM unit. In the example where the image sensor, inertial measurement unit and processor unit form part of an integrated unit, the integrated unit may comprise any other suitable component for the operation of the integrated unit, such as a battery and/or a Wi-Fi communication unit.

The imaging system described above may be or comprise an ultrasound imaging system console which can be used in conjunction with an ultrasound probe. The ultrasound probe may be any ultrasound probe suitable for obtaining ultrasound data of a subject. For example, the ultrasound probe may have a 1D ultrasound transducer array, a 2D ultrasound transducer array or a 3D matrix ultrasound array and comprise part of a static or portable ultrasound system.

In the examples described above, the image sensor, and motion sensor, may be coupled to the ultrasound probe. In the case of the imaging system being integrated into a mobile device such as a smartphone, mobile device may be coupled to the ultrasound probe. In the case that SLAM functionality is implemented in the probe, dedicated SLAM hardware may be integrated into the probe for performing the SLAM processing described above. The coupling may be such that it is a releasable and/or re-attachable coupling.

The imaging system or console fur such system may further include a display for displaying a real-time visualization of the orientation of the tool with respect to the representation of the surface to the user. The display may be part of any of the computers, mobile or non-mobile devices mentioned herein above. For example, the display may be adapted to display a graphical representation of the tool in the determined orientation with respect to a graphical representation of the surface. The real-time visualization of the orientation of the tool may be continuously updated based on incoming image data from the image sensor. The display may comprise a conventional display unit, such as a monitor. Alternatively, or additionally the display may include a headset to be worn by a user, such as an augmented reality headset. In the example of the display comprising an augmented reality headset, the augmented reality headset may be adapted to display a graphical representation of the orientation and trajectory of the tool such that the graphical representations align with the tool in the vision of the user. In some examples, the processing unit is configured to generate data for display of a graphical representation of a region of interest of a subject and its surface abutting the region of interest as well as a projected trajectory of the tool within the region of interest where the projected trajectory is a trajectory it could follow upon insertion of the tool into the region of interest through the surface and based on the orientation of the tool with respect to the surface. In some examples also the tool is graphically represented, but this is not necessary.

Figure 3A:
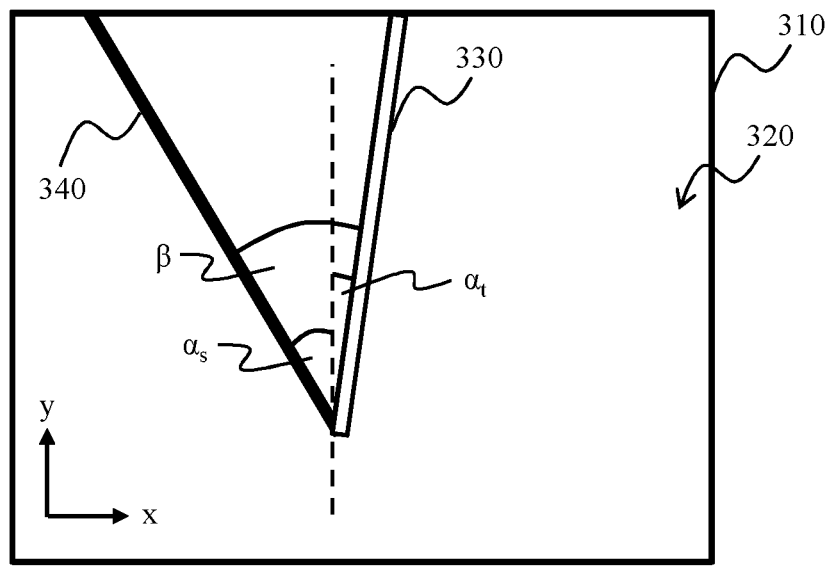
FIG. 3A shows a representation of the field of view of the image sensor.

FIG. 3A shows a representation 300 of the field of view 310 of the image sensor. Within the field of view of the image sensor is the representation of the surface 320, wherein the surface is described by a plane having a first axis, x, and a second axis, y, which is orthogonal to the x axis, the representation of the tool 330 and the representation of the tool shadow 340. The surface may be represented as a 3D surface map, resulting in a more accurate determination in the orientation of the tool, or a 2D plane, resulting in a reduced computation load, as described above.

Figure 3B:
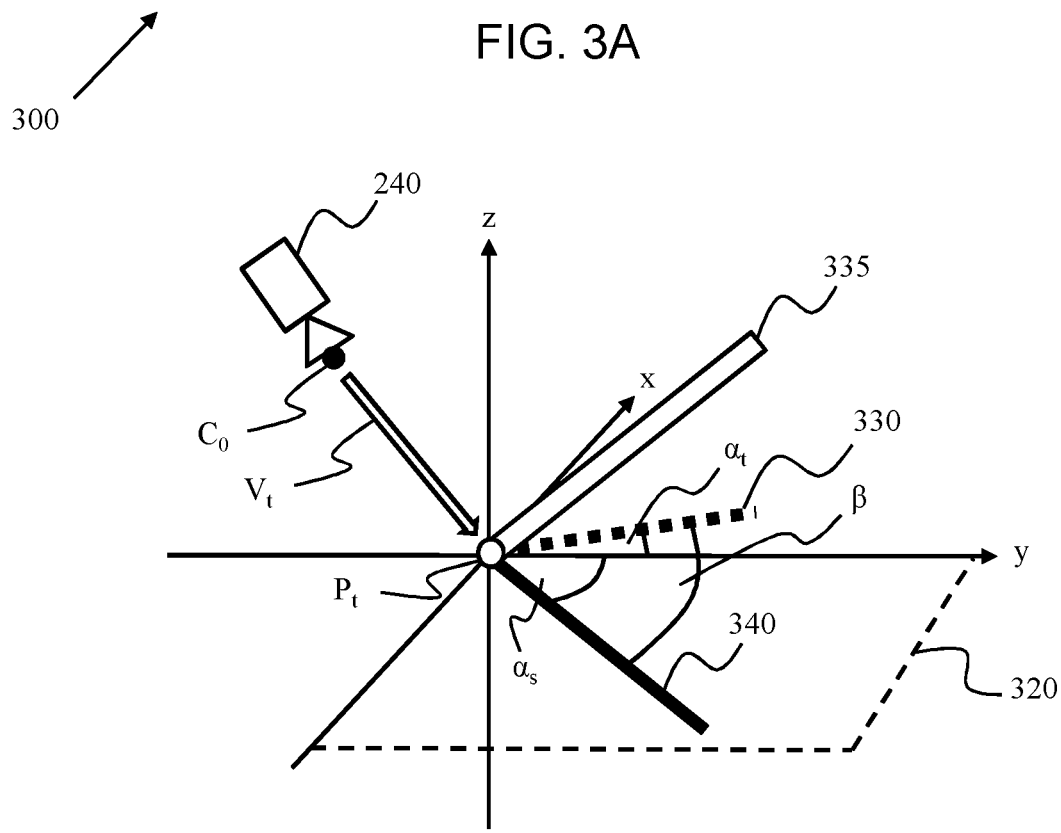
FIG. 3B shows a representation of a 3D coordinate system including aspects of the system of FIG. 2.

FIG. 3B shows a representation 350 of the representation of the surface 320, the tool 335 and the representation of the tool 330 as projected on to the x-y plane, and the representation of the tool shadow 340 in a 3D coordinate system, defined by three orthogonal axes (x, y and z).

As stated above, image-based segmentation may be applied to the image data in order to identify the representations of the tool and the tool shadow within the image data.

In a first example, the orientation of the tool 335 may be approximated by calculating a first angle, $\alpha_t$, between the representation of the tool 330 and the second axis, i.e. the y axis, and a second angle, $\beta$, between the representation of the tool 330 and the representation of the tool shadow 340. The location of where the tool touches the surface of the skin may be determined as the junction of the segmented representation of the tool and the segmented representation of the tool shadow. The camera perspective projection may influence this approximation and may be accounted for by performing a camera calibration.

The representations of the tool and the tool shadow may be described parametrically in pixel space as follows:

$$x_t = a_t y_t + b_t \tag{1}$$

and $$x_s + a_s y_s + b_s \tag{2}$$

wherein: $x_t$ and $x_s$ are the x coordinates of the segmented representations of the tool and the tool shadow, respectively; $y_t$ and $y_s$ are the y coordinates of the segmented representations of the tool and the tool shadow, respectively; and a and b represent constants for describing the relationship between the x and y coordinates of the representations of the tool and the tool shadow.

Rearranging equation (1), the first angle, $\alpha_t$, may be calculated as:

$$\alpha_t = \operatorname{atan}\left(\frac{x_t - b_t}{y_t}\right) = \operatorname{atan}(a_t) \quad (3)$$

Similarly, rearranging equation (2), the angle between the representation of the tool shadow and the y axis, $\alpha_s$, may be calculated as:

$$\alpha_s = \operatorname{atan}\left(\frac{x_s - b_s}{y_s}\right) = \operatorname{atan}(a_s) \quad (4)$$

The second angle, $\beta$, may then be calculated as:

$$\beta = a \tan(a_s - a_t) \quad (5)$$

The junction between the representation of the tool and the representation of the tool shadow, which is taken as the surface contact point, is computed by setting $x_t = x_s$ and $y_t = y_s$, which results in the following relationships:

$$y_t = \frac{(b_s - b_t)}{(1 - a_s)} \quad (6)$$

and $x_t = a_t y_t + b_t$ \quad (1)

The coordinates given in equations (6) and (1) above are in the pixel domain, i.e. they are coordinates within the image data obtained by the image sensor. Accordingly, the coordinates given in equations (6) and (1) above require additional processing in order to obtain the true coordinates of the tool and tool shadow within a 3D coordinate system.

The surface (e.g. of the skin) may be approximated as 2D plane or a 3D surface map of the surface may be generated by way of the SLAM hardware described above. The 3D coordinates of the surface contact point may be calculated by intersecting the vector $V_t$, which is defined as a vector from the image sensor origin $C_0$ to the tool entry point $P_t$ as defined in equations (6) and (1), with the surface (e.g. skin surface). The 3D coordinates of the surface contact point may be calculated as follows:

$$X_{3Dt} = x_t - x_o \quad (7)$$

and $$Y_{3Dt} = y_t - y_o \quad (8)$$

wherein: $X_{3Dt}$ and $Y_{3Dt}$ are the x and y coordinates of the surface contact point in the 3D coordinate system, respectively; and, $x_o$ and $y_o$ are the pixel coordinates which belong to the optical axes and can be derived via camera calibration.

For example, camera calibration may be used to derive certain camera parameters, such as the focal length, f, which may be determined by the distance from the image sensor to the optical center of the lens. Other camera parameters, such as, distortion parameters may be accounted for.

The surface may be approximated as a fixed plane, orthogonal to the optical axis of the camera at a fixed distance, D, from the tip of the tool, which results in the 3D z coordinate of the tip of the tool, $Z_{3Dt} = D$. A perspective camera model using the following equations may then be used to define the x and y 3D coordinates of the surface contact point.

$$x_t = \frac{f X_{3Dt}}{Z_{3Dt}} + x_o \quad (9)$$

$$y_t = \frac{f Y_{3Dt}}{Z_{3Dt}} + y_o \quad (10)$$

Figure 4:
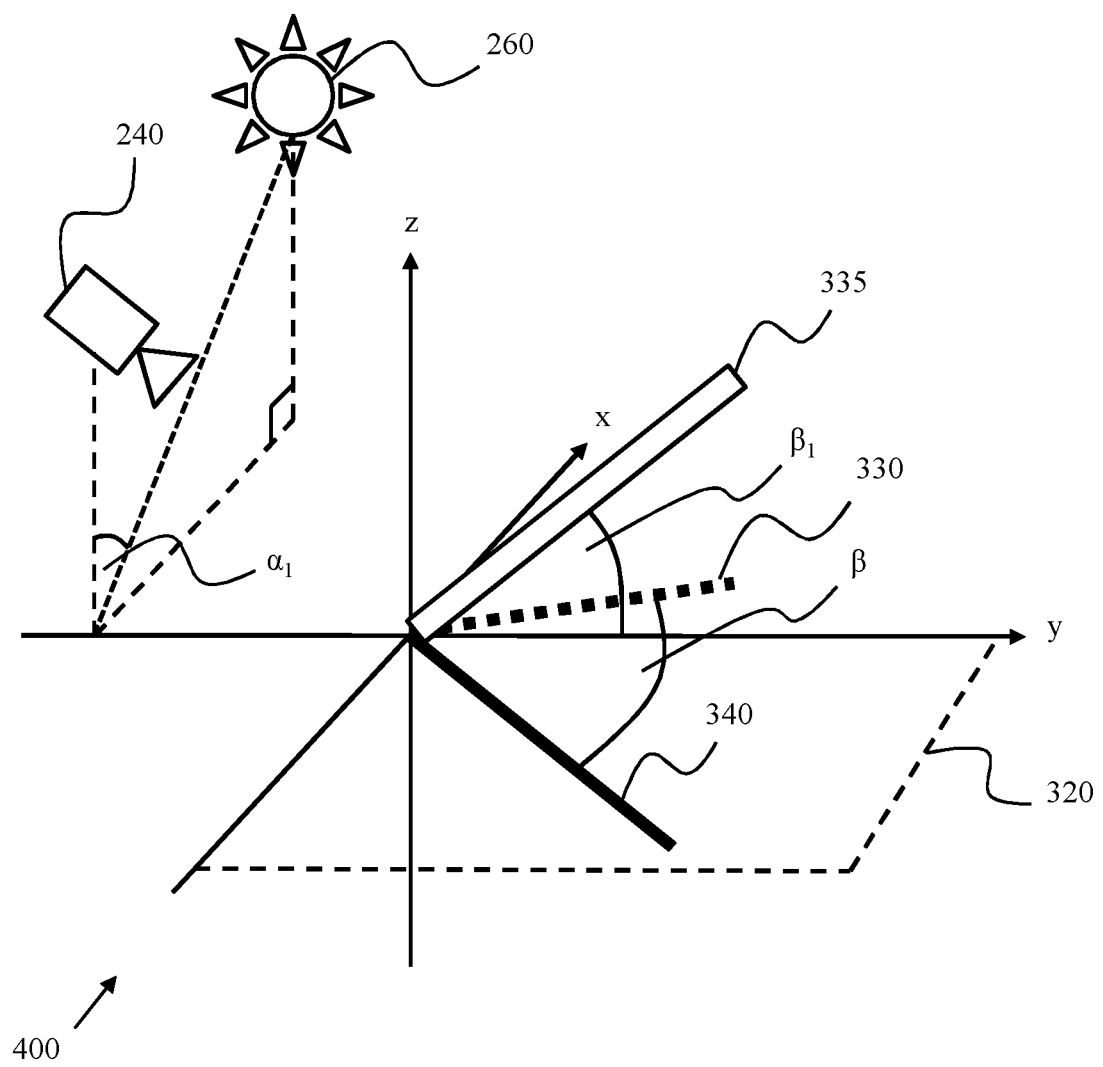
FIG. 4 shows a further representation of a 3D coordinate system including aspects of the system of FIG. 2.

Next, the elevation angle, $\beta_1$, between the tool and surface is computed. FIG. 4 shows a schematic representation 400 of the representation of the surface 320, the tool 335 and the representation of the tool 330 as projected onto the x-y plane, and the representation of the tool shadow 340 in a 3D coordinate system, defined by three orthogonal axes (x, y and z). In addition, FIG. 4 shows the image sensor 240 and light source 260 positioned relative to the tool 335.

As described above, the light source 260 is positioned at a known location relative to the image sensor 240, which causes a shadow of the tool 340 to be cast on the surface. The angle between representation of the tool and the representation of the tool shadow, $\beta$, i.e. the shadow angle, may be used as an approximation of the elevation angel, $\beta_1$, between the tool and the surface. In FIG. 4, $\alpha_1$ indicates the angle between the light source 260 and the center of the surface in front of the middle of the ultrasound probe. In the case that $\alpha_t$ is very small and the surface contact point is located close to the center in front of the middle of the probe, a scaling term may be applied to angle $\beta$ in order to arrive at angle $\beta_1$. The scaling term, $a_{scale}$, may be defined as follows:

$$a_{scale} = \tan(\alpha_1)$$

For $\alpha_1 = 45°$, $a_{scale} = 1.0$ and the relation between the elevation angle and the visual angle is 1.0. Put another way, the elevation angle may be determined based on the angle between the representation of the tool and tool shadow and the known position of the light source relative to the image sensor.

The calculations above result in a set of 3D coordinates representing the locations of the tool tip, or distal end of the tool, and two angles representing the orientation of the needle in the camera 3D coordinate system. This virtual object can then be visualized in combination with the 3D surface map of the surface, if available, and/or ultrasound data obtained by way of the ultrasound probe.

The trajectory of the tool may then be determined based on the derived orientation of the tool. For example, a trajectory of the tool may be represented on ultrasound data, which may include an ultrasound volume or a 2D ultrasound slice obtained by an ultrasound probe, when displayed to the user. The trajectory of the tool may be determined, for example when considering a rigid tool, by extrapolating a straight line from the point of tool entry below the surface (e.g. of the skin) based on the determined orientation. Alternatively, in the case of a non-rigid tool, the trajectory may be determined by estimating a path of the tool from the point of tool entry based on the resistance of the anatomy of the subject below the surface (e.g. of the skin).

The orientation and trajectory of the tool may be updated in real-time as the user moves the tool, thereby providing a means for checking the trajectory of the tool before the tool has entered the skin of the subject. The trajectory of the tool may be displayed with the ultrasound data using any suitable graphical means.

In the example where the system comprises an ultrasound probe, the position of the tool may be tracked using ultrasound data after the tool has passed through the surface. Put another way, when the tool has been inserted into the skin of the subject, the position of the tool under the surface may be tracked using the ultrasound data. The tracked position of the tool based on the ultrasound data may be used to correct and update the real-time orientation and trajectory of the tool as determined from the image data as described above.

In addition to the geometric methods described above, the orientation of the tool may be determined based on a 3D model of the surface, the tool, the light source and the image sensor. The model may take the position of the representation of the tool shadow relative to the representation of the tool as an input and provide an orientation of the tool as an output.

Further, the orientation of the tool may be determined by way of a machine learning algorithm. A machine-learning algorithm is any self-training algorithm that processes input data to produce or predict output data. Here, the input data may comprise an angle between the representation of the tool and the tool shadow in the image data and the output data comprises the orientation of the tool.

Suitable machine-learning algorithms for being employed in the present invention will be apparent to the skilled person. Examples of suitable machine-learning algorithms include decision tree algorithms and artificial neural networks. Other machine-learning algorithms such as logistic regression, support vector machines or Naïve Bayesian models are suitable alternatives.

The structure of an artificial neural network (or, simply, neural network) is inspired by the human brain. Neural networks are comprised of layers, each layer comprising a plurality of neurons. Each neuron comprises a mathematical operation. In particular, each neuron may comprise a different weighted combination of a single type of transformation (e.g. the same type of transformation, sigmoid etc. but with different weightings). In the process of processing input data, the mathematical operation of each neuron is performed on the input data to produce a numerical output, and the outputs of each layer in the neural network are fed into the next layer sequentially. The final layer provides the output.

Methods of training a machine-learning algorithm are well known. Typically, such methods comprise obtaining a training dataset, comprising training input data entries and corresponding training output data entries. An initialized machine-learning algorithm is applied to each input data entry to generate predicted output data entries. An error between the predicted output data entries and corresponding training output data entries is used to modify the machine-learning algorithm. This process can be repeated until the error converges, and the predicted output data entries are sufficiently similar (e.g. ±1%) to the training output data entries. This is commonly known as a supervised learning technique.

For example, where the machine-learning algorithm is formed from a neural network, (weightings of) the mathematical operation of each neuron may be modified until the error converges. Known methods of modifying a neural network include gradient descent, backpropagation algorithms and so on.

The training input data entries correspond to example angles between the representation of a tool and tool shadow. The training output data entries correspond to orientations of the tool.

The subject may undergo a pre-operative, or conebeam, computer tomography (CT) scan. In this case, additional 3D information relating the surface of the subject may be obtained by way of added metallic fiducial, or radiopaque, markers on the surface of the skin which are visible in the CT scan and detectable in the image data captured by the image sensor. Accordingly, the segmentation of the surface may be further based on the computer tomography data and the image data, thereby increasing the accuracy of the segmentation of the surface.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

A single processor or other unit may fulfill the functions of several items recited in the claims.

The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

If the term "adapted to" is used in the claims or description, it is noted the term "adapted to" is intended to be equivalent to the term "configured to".

Any reference signs in the claims should not be construed as limiting the scope.

List of Non-Limiting Embodiments

Embodiment 1. A method (100) for determining an orientation of a tool for performing a medical intervention on a subject, the method comprising:
  obtaining (110), using an image sensor, image data for an image of a surface of, or over, a subject, a tool adjacent the surface and a tool shadow on the surface, the tool shadow resulting from light incident on the tool generated by way of at least one light source positioned at a predetermined position relative to the image sensor;
  obtaining (120) a representation of the surface;
  segmenting (130) a representation of the tool from the image data;
  segmenting (140) a representation of the tool shadow from the image data;
  determining (150) an elevation angle of the tool based on the representation of the surface, the representation of the tool and the representation of the tool shadow, the elevation angle being the angle between the surface and the tool;
  determining (160) an orientation of the tool relative to the surface based on the segmented representation of the tool, the segmented representation of the tool shadow and the elevation angle.

Embodiment 2. A method (100) as defined in embodiment 1, further comprising identifying a surface contact point based on the image data, the surface contact point being a location on the surface where the tool makes contact with the surface, based on the representation of the tool and the representation of the tool shadow, and wherein determining the elevation angle of the tool is further based on the surface contact point.

Embodiment 3. A method (100) as defined in any of embodiments 1 to 2, wherein obtaining the representation of the surface comprises:
  obtaining motion data by way of a motion sensor, the motion data representing a motion of the image sensor during the acquisition of the image data;
  generating a 3D surface map of the surface of the subject based on a combination of the image data and the motion data; and
  segmenting the representation of the surface from the 3D surface map.

Embodiment 4. A method (100) as defined in embodiment 3, wherein the method further comprises obtaining computer tomography data of the surface of the subject, the surface having one or more radiopaque markers secured thereon, and wherein segmenting the representation of the surface is based on a combination of the computer tomography data, the image data and the motion data.

Embodiment 5. A method (100) as defined in any of embodiments 1 to 2, wherein obtaining the representation of the surface comprises generating a 2D plane approximation of the surface.

Embodiment 6. A method (100) as defined in any of embodiments 1 to 5, wherein determining the elevation angle of the tool comprises:
  calculating a shadow angle between the representation of the tool and the representation of the tool shadow; and
  determining the elevation angle by adjusting the shadow angle based on the position of the at least one light source relative to the image sensor.

Embodiment 7. A method (100) as defined in any of embodiments 1 to 6, wherein determining the elevation angle comprises applying a machine learning algorithm to the segmented representation of the tool and the segmented representation of the tool shadow.

Embodiment 8. A method (100) as defined in any of embodiments 1 to 7, wherein the method further comprises calculating a projected trajectory of the tool based on the determined orientation of the tool, the projected trajectory representing the predicted path of the tool after the tool has passed through the surface of the subject.

Embodiment 9. A method (100) as claimed in any of embodiments 1 to 8, wherein the method further comprises generating a real-time visualization of the orientation of the tool with respect to the representation of the surface.

Embodiment 10. A method (100) as defined in any of embodiments 1 to 9, wherein the light generated by the at least one light source is coded light, each light source having a unique coded light signature, thereby causing one or more unique modulated shadows to be cast by the tool, wherein the method further comprises:
  for each of the one or more unique modulated shadows, deriving the unique coded signature from the unique modulated shadow; and
  pairing each of the one or more unique modulated shadows with a light source based on the derived unique coded signature; and wherein,
  segmenting the representation of the tool shadow is based on the paired one or more unique modulated shadows.

Embodiment 11. A computer program comprising computer program code means which is adapted, when said computer program is run on a computer, to implement the steps of:
  obtaining, using an image sensor, image data for an image of a surface of, or over, a subject, a tool for performing a medical intervention on a subject adjacent the surface and a tool shadow on the surface, the tool shadow resulting from light incident on the tool generated by way of at least one light source positioned at a predetermined position relative to the image sensor;
  obtaining a representation of the surface;
  segmenting a representation of the tool from the image data;
  segmenting a representation of the tool shadow from the image data;
  determining an elevation angle of the tool based on the representation of the surface, the representation of the tool and the representation of the tool shadow, the elevation angle being the angle between the surface and the tool;
  determining an orientation of the tool relative to the surface based on the segmented representation of the tool, the segmented representation of the tool shadow and the elevation angle.

Embodiment 12. A computer program as defined in embodiment 11, wherein the computer program is adapted, when said computer program is run on a computer, to perform the additional steps of identifying a surface contact point based on the image data, the surface contact point being a location on the surface where the tool makes contact with the surface, based on the representation of the tool and the representation of the tool shadow, and wherein determining the elevation angle of the tool is further based on the surface contact point.

Embodiment 13. A computer-readable storage medium comprising instructions which, when executed by a computer, cause the computer to carry out the steps of:
  obtaining, using an image sensor, image data for an image of a surface of, or over, a subject, a tool for performing a medical intervention on a subject adjacent the surface and a tool shadow on the surface, the tool shadow resulting from light incident on the tool generated by way of at least one light source positioned at a predetermined position relative to the image sensor;
  obtaining a representation of the surface;
  segmenting a representation of the tool from the image data;
  segmenting a representation of the tool shadow from the image data;
  determining an elevation angle of the tool based on the representation of the surface, the representation of the tool and the representation of the tool shadow, the elevation angle being the angle between the surface and the tool;
  determining an orientation of the tool relative to the surface based on the segmented representation of the tool, the segmented representation of the tool shadow and the elevation angle.

Embodiment 14. A computer-readable storage medium as defined in embodiment 13, wherein the computer-readable storage medium further comprises instructions which, when executed by a computer, cause the computer to carry out the additional steps of identifying a surface contact point within the image data, the surface contact point being a location on the surface where the tool makes contact with the surface, based on the representation of the tool and the representation of the tool shadow, and wherein determining the elevation angle of the tool is further based on the surface contact point.

Embodiment 15. A processing system (270) for determining the orientation of a tool for performing a medical intervention on a subject, the processing system comprising:
  an input for receiving image data from an image sensor for an image of a surface of, or over, a subject, a tool adjacent the surface and a tool shadow on the surface, the tool shadow resulting from light incident on the tool generated by way of at least one light source positioned at a predetermined position relative to the image sensor; and
  a processor coupled to the input to:
    obtain a representation of the surface;
    segment a representation of the tool from the image data;
    segment a representation of the tool shadow from the image data;
    determine an elevation angle of the tool based on the representation of the surface, the representation of the tool and the representation of the tool shadow, the elevation angle being the angle between the surface and the tool; and
    determine an orientation of the tool relative to the surface based on the segmented representation of the tool and the segmented representation of the tool shadow.

Embodiment 16. A system (200) for determining the orientation of a tool, the system comprising:
  the processing system (270) defined in embodiment 15;
  a tool (220) for performing a medical intervention on a subject, the tool being adapted to pass through the surface of the subject;
  an image sensor (210) adapted to acquire the image data; and
  at least one light source (250) adapted to illuminate the tool, the light source being positioned at a predetermined position relative to the image sensor.

Embodiment 17. A system (200) as defined in embodiment 16, wherein the processing system is further adapted to identify a surface contact point based on the image data, the surface contact point being a location on the surface where the tool makes contact with the surface, based on the representation of the tool and the representation of the tool shadow, and wherein determining the elevation angle of the tool is further based on the surface contact point.

Embodiment 18. A system (200) as defined in any of embodiment 16 to 17, wherein the system further comprises a motion sensor (280) coupled to the image sensor, the motion sensor being adapted to obtain motion data, the motion data representing a motion of the image sensor during the acquisition of the image data, and wherein the processing system, when obtaining the representation of the surface, is further adapted to:
  generate a 3D surface map of the surface of the subject based on a combination of the image data and the motion data; and
  segment the representation of the surface from the 3D surface map.

Embodiment 19. A system (200) as defined in any of embodiment 16 to 18, wherein the system further comprises an ultrasound probe, the ultrasound probe being adapted to obtain ultrasound data from an imaging region below the surface of the subject, wherein the image sensor is coupled to the ultrasound probe, and wherein the processing system is further adapted to:
  obtain ultrasound data from the imaging region, the ultrasound data including an ultrasound representation of the tool after the tool has passed through the surface;
  track the position of the tool based on the ultrasound data; and
  update the orientation of the tool based on the tracked position of the tool.

Embodiment 20. A system (200) as defined in any of embodiments 16 to 19, wherein the at least one light source is adapted to generate coded light, each light source having a unique coded light signature, thereby causing one or more unique modulated shadows to be cast by the tool, and wherein the processing system is further adapted to:
  for each of the one or more unique modulated shadows, derive the unique coded signature from the unique modulated shadow; and
  pair each of the one or more unique modulated shadows with a light source based on the derived unique coded signature; and wherein,
  segment the representation of the tool shadow is based on the paired one or more unique modulated shadows.

The invention claimed is:

1. A method for determining an orientation of a tool for performing a medical intervention on a subject, the method comprising:
  obtaining, using an image sensor, image data for an image of a surface of, or over, a subject, a tool adjacent the surface, and a tool shadow on the surface, the tool shadow resulting from light incident on the tool generated by way of at least one light source positioned at a predetermined position relative to the image sensor;
  obtaining a representation of the surface;
  segmenting a representation of the tool from the image data;
  segmenting a representation of the tool shadow from the image data;
  determining an elevation angle of the tool based on a geometric relationship between the representation of the surface, the representation of the tool, and the representation of the tool shadow, the elevation angle being the angle between the surface and the tool; and
  determining an orientation of the tool relative to the surface based on the segmented representation of the tool, the segmented representation of the tool shadow, and the elevation angle.

2. The method of claim 1, further comprising identifying a surface contact point based on the image data, the surface contact point being a location on the surface where the tool makes contact with the surface, based on the representation of the tool and the representation of the tool shadow, and wherein determining the elevation angle of the tool is further based on the surface contact point.

3. The method of claim 1, wherein obtaining the representation of the surface comprises:
  obtaining motion data by way of a motion sensor, the motion data representing a motion of the image sensor during the acquisition of the image data;

generating a 3D surface map of the surface of the subject based on a combination of the image data and the motion data; and segmenting the representation of the surface from the 3D surface map.

4. The method of claim 3, wherein the method further comprises obtaining computer tomography data of the surface of the subject, the surface having one or more radiopaque markers secured thereon, and wherein segmenting the representation of the surface is based on a combination of the computer tomography data, the image data and the motion data.

5. The method of claim 1, wherein obtaining the representation of the surface comprises generating a 2D plane approximation of the surface.

6. The method of claim 1, wherein determining the elevation angle of the tool comprises:
calculating a shadow angle between the representation of the tool and the representation of the tool shadow; and
determining the elevation angle by adjusting the shadow angle based on the position of the at least one light source relative to the image sensor.

7. The method of claim 1, wherein determining the elevation angle comprises applying a machine learning algorithm to the segmented representation of the tool and the segmented representation of the tool shadow.

8. The method of claim 1, wherein the method further comprises calculating a projected trajectory of the tool based on the determined orientation of the tool, the projected trajectory representing the predicted path of the tool after the tool has passed through the surface of the subject.

9. The method of claim 1, wherein the method further comprises generating a real-time visualization of the orientation of the tool with respect to the representation of the surface.

10. The method of claim 1, wherein the light generated by the at least one light source is coded light, each light source having a unique coded light signature, thereby causing one or more unique modulated shadows to be cast by the tool, wherein the method further comprises:
for each of the one or more unique modulated shadows, deriving the unique coded signature from the unique modulated shadow; and
pairing each of the one or more unique modulated shadows with a light source based on the derived unique coded signature; and wherein,
segmenting the representation of the tool shadow is based on the paired one or more unique modulated shadows.

11. A non-transitory computer-readable storage medium having stored a computer program comprising instructions, which, when executed by a processor, cause the processor to:
obtain, using an image sensor, image data for an image of a surface of, or over, a subject, a tool for performing a medical intervention on a subject adjacent the surface and a tool shadow on the surface, the tool shadow resulting from light incident on the tool generated by way of at least one light source positioned at a predetermined position relative to the image sensor;
obtain a representation of the surface;
segment a representation of the tool from the image data;
segment a representation of the tool shadow from the image data;
determine an elevation angle of the tool based on a geometric relationship between the representation of the surface, the representation of the tool, and the representation of the tool shadow, the elevation angle being the angle between the surface and the tool; and
determine an orientation of the tool relative to the surface based on the segmented representation of the tool, the segmented representation of the tool shadow, and the elevation angle.

12. The non-transitory computer-readable storage medium of claim 11, wherein the instructions further cause the processor to identify a surface contact point based on the image data, the surface contact point being a location on the surface where the tool makes contact with the surface, based on the representation of the tool and the representation of the tool shadow, and wherein determining the elevation angle of the tool is further based on the surface contact point.

13. The non-transitory computer-readable storage medium of claim 11, wherein the instructions further cause the processor to:
obtain, using a motion sensor coupled to the image sensor, motion data, the motion data representing a motion of the image sensor during the acquisition of the image data;
generate a 3D surface map of the surface of the subject based on a combination of the image data and the motion data; and
segment the representation of the surface from the 3D surface map.

14. The non-transitory computer-readable storage medium of claim 11, wherein the instructions further cause the processor to:
obtain, using an ultrasound probe, ultrasound data from an imaging region below the surface of the subject, wherein the image sensor is coupled to the ultrasound probe;
obtain ultrasound data from the imaging region, the ultrasound data including an ultrasound representation of the tool after the tool has passed through the surface;
track the position of the tool based on the ultrasound data; and
update the orientation of the tool based on the tracked position of the tool.

15. The non-transitory computer-readable storage medium of claim 11, wherein determining the elevation angle of the tool comprises:
calculating a shadow angle between the representation of the tool and the representation of the tool shadow; and
determining the elevation angle by adjusting the shadow angle based on the position of the at least one light source relative to the image sensor.

16. A system for determining the orientation of a tool for performing a medical intervention on a subject, the system comprising:
an image sensor configured to obtain an image of a surface of, or over, a subject, a tool adjacent the surface and a tool shadow on the surface, the tool shadow resulting from light incident on the tool generated by way of at least one light source positioned at a predetermined position relative to the image sensor; and
a processor coupled to the image sensor, the processor configured to:
obtain a representation of the surface;
segment a representation of the tool from the image data;
segment a representation of the tool shadow from the image data;
determine an elevation angle of the tool based on a geometric relationship between the representation of the surface, the representation of the tool, and the representation of the tool shadow, the elevation angle being the angle between the surface and the tool; and determine an orientation of the tool relative to the surface based on the segmented representation of the tool, and the segmented representation of the tool shadow.

17. The system of claim 16, further comprising:

a tool for performing a medical intervention on a subject, the tool configured to pass through the surface of the subject; and at least one light source configured to illuminate the tool, the light source being positioned at a predetermined position relative to the image sensor.

18. The system of claim 17, wherein the processor is further configured to identify a surface contact point based on the image data, the surface contact point being a location on the surface where the tool makes contact with the surface, based on the representation of the tool and the representation of the tool shadow, and wherein determining the elevation angle of the tool is further based on the surface contact point.

19. The system of claim 17, wherein the system further comprises a motion sensor coupled to the image sensor, the motion sensor configured to obtain motion data, the motion data representing a motion of the image sensor during the acquisition of the image data, and wherein the processor, when obtaining the representation of the surface, is further configured to:

generate a 3D surface map of the surface of the subject based on a combination of the image data and the motion data; and segment the representation of the surface from the 3D surface map.

20. The system of claim 17, wherein the system further comprises an ultrasound probe, the ultrasound probe configured to obtain ultrasound data from an imaging region below the surface of the subject, wherein the image sensor is coupled to the ultrasound probe, and wherein the processor is further configured to:

obtain ultrasound data from the imaging region, the ultrasound data including an ultrasound representation of the tool after the tool has passed through the surface;

track the position of the tool based on the ultrasound data; and update the orientation of the tool based on the tracked position of the tool.

* * * * *